(12) United States Patent
Benco et al.

(10) Patent No.: US 8,219,144 B2
(45) Date of Patent: Jul. 10, 2012

(54) DISABLING OF MOBILE PHONE CAMERA OPERATION BY VIDEO-RESTRICTED LOCATION DEVICE

(75) Inventors: David S. Benco, Winfield, IL (US); Sanjeev Mahajan, Naperville, IL (US); Baoling S. Sheen, Naperville, IL (US); Sandra L. True, St. Charles, IL (US)

(73) Assignee: Alcatel Lucent, Paris (FR)

( * ) Notice: Subject to any disclaimer, the term of this patent is extended or adjusted under 35 U.S.C. 154(b) by 1190 days.

(21) Appl. No.: 12/008,469

(22) Filed: Jan. 11, 2008

(65) Prior Publication Data

US 2009/0181716 A1    Jul. 16, 2009

(51) Int. Cl.
*H04W 24/00* (2009.01)

(52) U.S. Cl. ............. 455/556.1; 455/456.2; 455/456.32; 455/569.2

(58) Field of Classification Search ............... 455/456.1, 455/456.2, 456.3, 569.2
See application file for complete search history.

(56) References Cited

U.S. PATENT DOCUMENTS

| | | | |
|---|---|---|---|
| 6,973,333 B1 * | 12/2005 | O'Neil | 455/569.2 |
| 7,769,394 B1 * | 8/2010 | Zhu | 455/456.1 |
| 2002/0068573 A1 * | 6/2002 | Raverdy et al. | 455/445 |
| 2005/0239481 A1 * | 10/2005 | Seligmann | 455/456.2 |
| 2005/0277428 A1 * | 12/2005 | Nathan Brown | 455/456.3 |
| 2006/0046746 A1 * | 3/2006 | Ranford et al. | 455/456.5 |
| 2008/0058006 A1 * | 3/2008 | Ladouceur | 455/556.1 |
| 2009/0111452 A1 * | 4/2009 | Ying et al. | 455/419 |
| 2009/0170532 A1 * | 7/2009 | Lee et al. | 455/456.3 |

* cited by examiner

*Primary Examiner* — Kamran Afshar
*Assistant Examiner* — Sayed T Zewari
(74) *Attorney, Agent, or Firm* — Carmen Patti Law Group, LLC

(57) ABSTRACT

An apparatus in one example has: a predetermined location having at least a wireless communication device, the wireless communication device having a predetermined coverage area; a mobile terminal that communicates with the wireless communication device when the mobile terminal is within the predetermined coverage area; the mobile terminal having a camera and a functionality that selectively disables and enables the camera; and the wireless communication device having a functionality that causes the mobile terminal to disable the camera when the mobile terminal is within the predetermined coverage area, and wherein the mobile terminal effects an enabling of the camera when the mobile terminal leaves the predetermined coverage area.

20 Claims, 4 Drawing Sheets

DISABLING OF MOBILE PHONE CAMERA OPERATION BY VIDEO-RESTRICTED LOCATION DEVICE

TECHNICAL FIELD

The invention relates generally to telecommunication networks, and more particularly to a telecommunication network that disables a mobile phone camera when it enters a "video-restricted" area of mobile phone coverage.

BACKGROUND

A camera phone is a mobile terminal that has a camera built-in and is coupled with a server-based infrastructure or protocol, such as MMS (Multimedia Messaging Service), that allows the user to instantly share pictures and video with someone that has a device adapted to receive pictures and video. Typically the receiving device must have a web browser with messaging or must be capable of decoding and displaying MMS information, as opposed to an ordinary telephone for example. The picture and video are usually delivered after the message recipient requests they be sent in response to a notification of a picture or video message received at a server.

While camera phones have been found useful by tourists and for other common civilian purposes, as they are cheap, convenient, and portable; they have also posed controversy, as they enable surreptitious photography. A user may pretend to be simply talking on the phone or browsing the internet, drawing no suspicion, and be able to photograph a person or place illegally or against that person's wishes.

From time to time, organizations and places have prohibited or restricted the use of camera phones and other cameras because of the privacy, security, and copyright issues they pose. Such places include the Pentagon, federal and state courts, museums, theaters, and local fitness clubs.

SUMMARY

One implementation encompasses an apparatus. This embodiment of the apparatus may comprise: a predetermined location having at least a wireless communication device, the wireless communication device having a predetermined coverage area; a mobile terminal that communicates with the wireless communication device when the mobile terminal is within the predetermined coverage area; the mobile terminal having a camera and a functionality that selectively disables and enables the camera; and the wireless communication device having a functionality that causes the mobile terminal to disable the camera when the mobile terminal is within the predetermined coverage area, and wherein the mobile terminal effects an enabling of the camera when the mobile terminal leaves the predetermined coverage area.

One implementation encompasses a method. This embodiment of the method may comprise: communicating between a mobile terminal and a wireless communication device when the mobile terminal is within range of the wireless communication device; and disabling a camera in the mobile terminal, via the wireless communication device, when the mobile terminal is within range of the wireless communication device, and enabling, via the mobile terminal, the camera when the mobile terminal is out of range of the wireless communication device.

Another implementation encompasses an apparatus. This embodiment of the apparatus may comprise: a wireless communication device; a mobile terminal that communicates with the wireless communication device when the mobile terminal is within range of the wireless communication device; the mobile terminal having a camera and a functionality that selectively disables and enables the camera; and the wireless communication device having a functionality that causes the mobile terminal to disable the camera when the mobile terminal is within range of the wireless communication device, and wherein the mobile terminal effects an enabling of the camera when the mobile terminal is out of range of the wireless communication device.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Very often subscribers buy mobile phones with cameras and video cameras hoping that it would give them the flexibility to share pictures or videos with friends and family. However, the same phones become liabilities when they visit, for example, a court house and they are told by a security guard that they can't take camera phone with them and there is no place to deposit the phone. Similarly, there are other establishments like clubhouses, swimming clubs, etc. that do not allow camera phones into locker rooms or on the premises.

In these cases it would be desirable for the wireless network to automatically turn off the mobile camera when the phone enters a "video-restricted" area thus protecting the privacy of patrons and allowing mobile subscriber access to the their mobile phone for normal voice calls and non-video data sessions.

It is to be understood that although the present method and apparatus is described in the context of a building, however numerous other locations, systems and structures may be utilized with the present method and apparatus.

Mobile terminals and the network they operate under vary significantly from provider to provider, and country to country. However, all of them communicate through electromagnetic radio waves with a cell site base station, the antennas of which are usually mounted on a tower, pole or building.

The mobile terminals typically have a low-power transceiver that transmits voice and data to the nearest cell sites, usually not more than approximately 5 to 8 miles away. When the mobile terminal or data device is turned on, it registers with the mobile telephone exchange, or mobile switching center, with its unique identifiers, and will then be alerted by the mobile switching center when there is an incoming telephone call. In a cellular network the mobile terminal constantly listens for the strongest signal being received from the surrounding base stations. As the user moves around the network, the mobile device will "handoff" to various cell sites during calls, or while waiting (idle) between calls it will reselect cell sites.

Cell sites have relatively low-power (often only one or two watts) radio transmitters which broadcast their presence and relay communications between the mobile handsets and the switch. A cell site thus has a coverage area outside of which the mobile terminal is not in communication with the respective base station. Although embodiments of the present method and apparatus may be used with these standard cell sites, the embodiments are more typically utilized with microsites that have smaller areas of coverage. Alternately a cell site may use a directional antenna rather than the base station referred to above.

Figure 1:
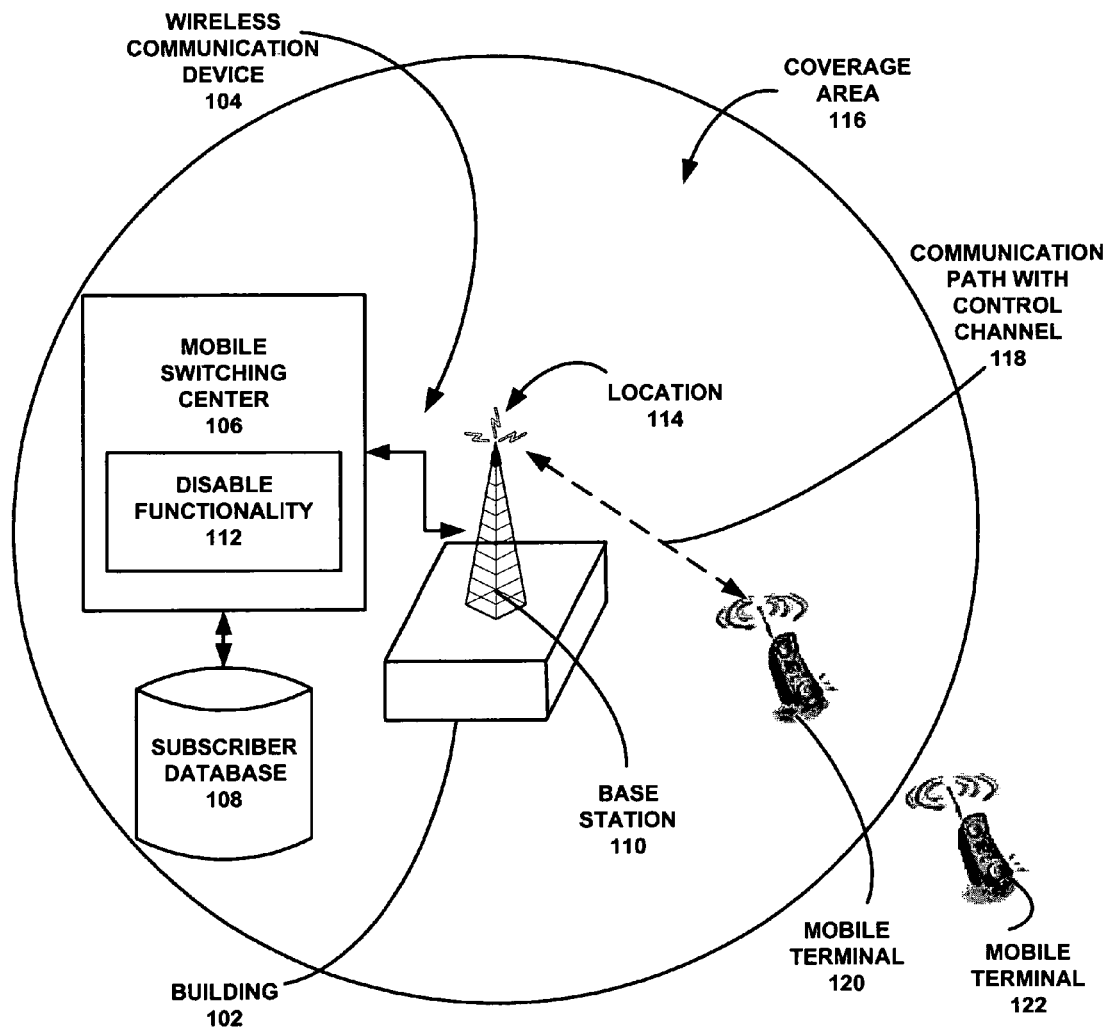
FIG. 1 is a representation of one implementation of an apparatus that disables a mobile phone camera when it enters a "video-restricted" area of mobile phone coverage.

FIG. 1 is a representation of one implementation of an apparatus that disables a mobile phone camera when it enters a "video-restricted" area of mobile phone coverage. The present method and apparatus may be used with a variety of equipment, such as, mobile phones, mobile cameras for pictures and/or video, cell phones, personal data assistants, and other wireless devices. Such devices may in general be referred to as mobile terminals.

Very often subscribers buy mobile phones with cameras and video cameras hoping that it would give them the flexibility to share pictures or videos with friends and family. However, the same phones become liabilities when they visit, for example, a court house and they are told by a security guard that they can't take camera phone with them and there is no place to deposit the phone. Similarly, there are other establishments like clubhouses, swimming clubs, etc. that do not allow camera phones into locker rooms or on the premises.

In these cases it would be desirable for the wireless network to automatically turn off the mobile camera when the phone enters a "video-restricted" area thus protecting the privacy of patrons and allowing mobile subscriber access to the their mobile phone for normal voice calls and non-video data sessions.

In one embodiment of the present method and apparatus a building 102 may have a wireless communication device 104. The wireless communication device 104 may be, or may be part of, one or more of a telephone network, a local area network ("LAN"), the Internet, and a wireless network. In the depicted embodiment, the wireless communication device 104 may have a base station 110 operatively coupled to a mobile switching center 106 that is operatively coupled to a subscriber database 108. Typically, the base station 110 is at a predetermined location 114 and has a coverage area 116. The mobile switching center 106 may be operatively coupled to a subscriber database 108. The mobile switching center 106 may also have disable functionality 112, typically a software module, which effects the disabling of the mobile terminal camera when it enters a "video-restricted" area of mobile terminal coverage.

As depicted in FIG. 1 when a mobile terminal 120 is within the coverage area 116, the mobile terminal 120 communicates with the base station 110 along a communication path 118 that has a control channel. The mobile terminal 122 is outside of the coverage area 116 and therefore is not in communication with the base station 110.

One methodology of the present method and apparatus is for the network to instruct the mobile terminal to disable the camera. The camera may be a picture camera and/or a video camera. Another methodology is for the mobile terminal to disable the camera. A further methodology is for the mobile terminal to re-enable the camera. Thus when the mobile terminal 120 enters the predetermined coverage area 116, the wireless communication device 104 causes the mobile terminal 120 to disable the camera in the mobile terminal 120. The mobile terminal, such as mobile terminal 122, may effect an enabling of the camera when the mobile terminal 122 leaves the predetermined coverage area 116.

Figure 2:
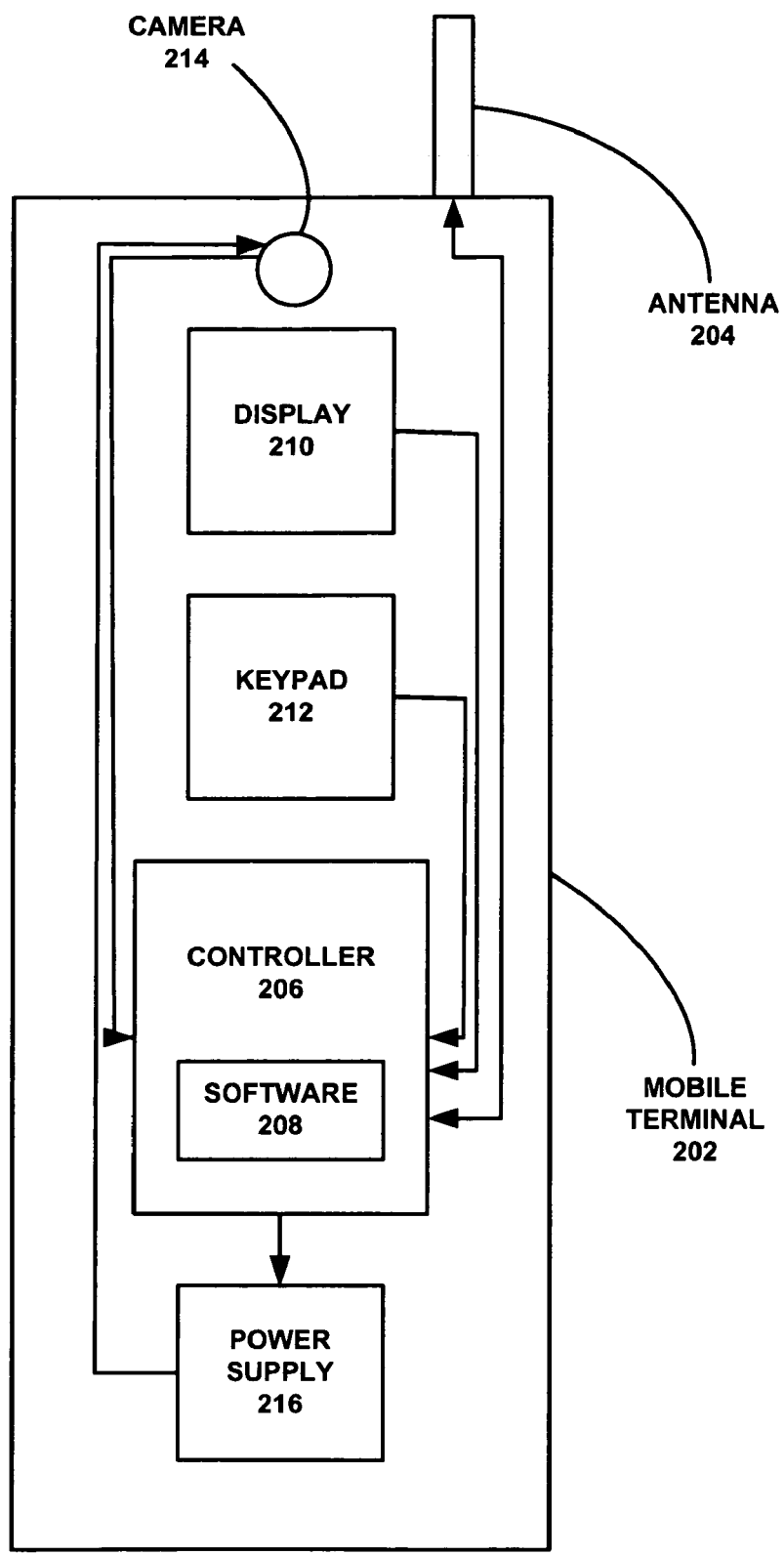
FIG. 2 depicts one embodiment of a mobile phone according to the present method and apparatus.

FIG. 2 depicts one embodiment of a mobile phone or terminal 202 according to the present method and apparatus. In this embodiment the mobile terminal 202 may have an antenna 204 operatively coupled to a controller 206, which has a software module 208. Predetermined signals in the received control channel cause the software module 208 to disable the functionality that operates a camera 214. Alternatively, the software module 208 may disconnect the camera 214 from the power supply 216. The mobile terminal 202 may have a keypad 212 and a display 210. The mobile terminal 202 may display a predetermined icon on the display 210 when the camera 214 is disabled.

Figure 3:
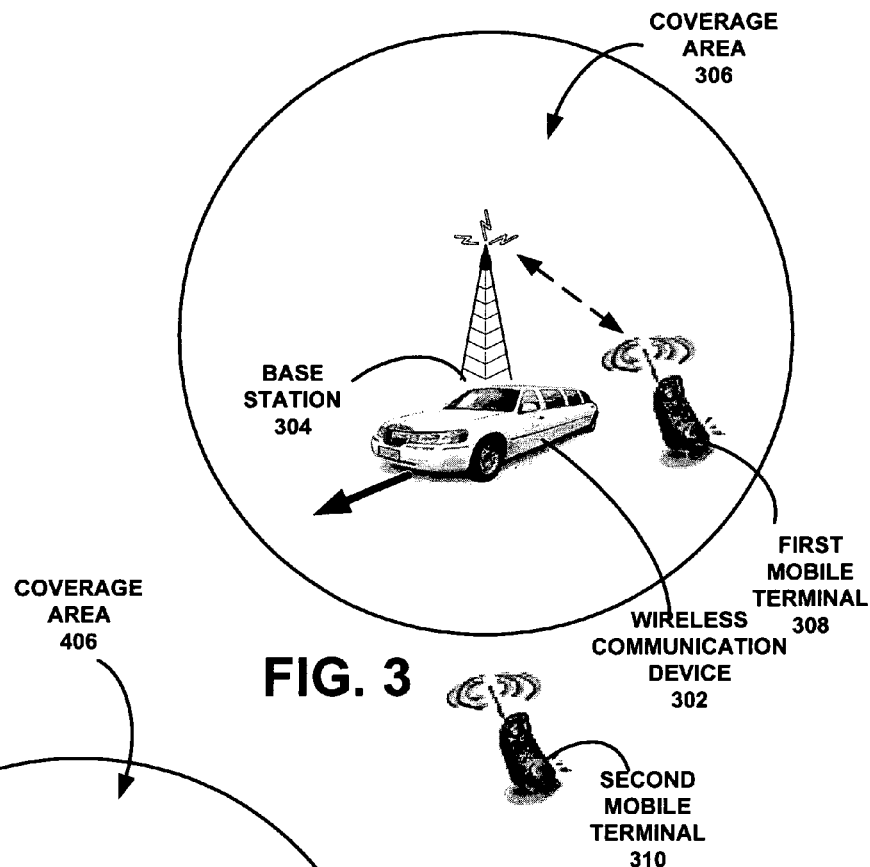
FIGS. 3 and 4 depict another implementation of an apparatus that disables a mobile phone camera when it enters a "video-restricted" area of mobile phone coverage.
Figure 4:
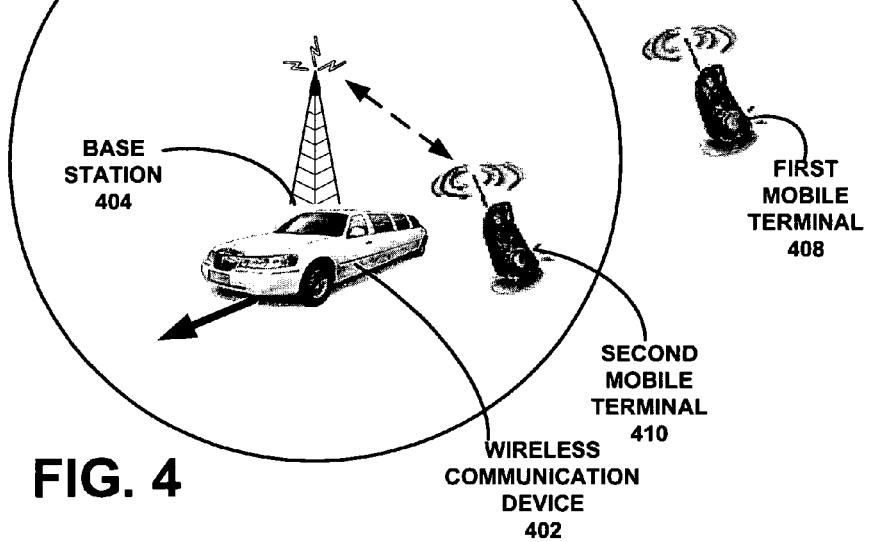

FIGS. 3 and 4 depict another implementation of an apparatus that disables a mobile phone camera when it enters a "video-restricted" area of mobile phone coverage.

In this embodiment as depicted in FIG. 3 the base station 304 is contained in a wireless communication device 302 that is mobile, for example, it may be contained in a vehicle. Therefore the coverage area 306 moves along with the wireless communication device 302 in the vehicle. First and second mobile terminals 308 and 310 may be stationary or moving. In either case the wireless communication device 302 automatically effects a disabling of the camera when the first mobile terminal 308 is within the predetermined coverage area 306. The second mobile terminal 310 automatically effects an enabling of the camera when the second mobile terminal 310 is outside of the predetermined coverage area 302.

In FIG. 4 the wireless communication device 402 with the base station 404 has move such that the first mobile terminal 408 is outside of the predetermined coverage area 406, and the second mobile terminal 410 is within the predetermined coverage area 406. The camera of the first mobile terminal 408 is now enabled by the first mobile terminal 408, and the camera of the second mobile terminal 410 is now disabled by wireless communication device 402.

Figure 5:
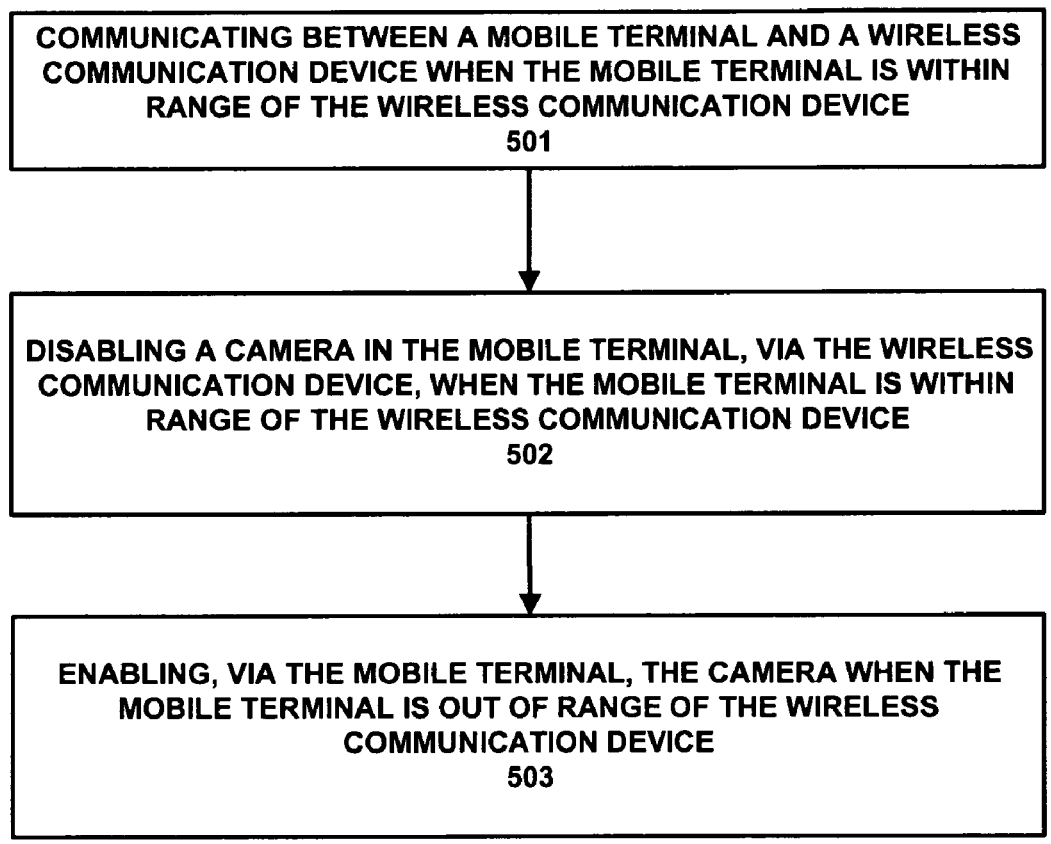
FIG. 5 is a representation of one exemplary flow diagram according to the present method and apparatus.

FIG. 5 is a representation of one exemplary flow diagram according to the present method and apparatus. In this embodiment the method may have the following steps: communicating between a mobile terminal and a wireless communication device when the mobile terminal is within range of the wireless communication device (step 501); disabling a camera in the mobile terminal, via the wireless communication device, when the mobile terminal is within range of the wireless communication device (step 502); and enabling, via the mobile terminal, the camera when the mobile terminal is out of range of the wireless communication device (step 503).

In summary some embodiments of the present method and apparatus may operate as follows.

All mobile phone systems have a signaling channel that is continuously transmitting information about the network and providing information to the mobiles in the coverage area that would assist them in acquiring the system. In CDMA systems this channel is referred to as the control channel.

Interested businesses (a court house, a swimming club etc) may install low power base stations at or around their premises or work with the service provider to install a directional antenna in the direction of their business.

The directional antenna or the local base station may then add additional data to its control channel that instructs all the mobiles in the coverage area to disable their respective cameras.

When a mobile terminal receives the additional data in the control channel instructing it to disable the picture camera/video camera, the mobile terminal may disconnect the power supply to the camera or may disable the camera functionality of the phone by instructing the software to ignore user commands to operate the camera.

The mobile terminal may display a special icon on the display when the camera is disabled for easy verification of the status of the camera.

Once the mobile terminal moves out of the coverage area, it no longer receives the additional data. Once the additional data stops coming in the control channel the mobile terminal may enable the camera and remove the icon from the display.

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. Examples of a computer-readable signal-bearing medium for the apparatus may comprise the recordable data storage medium (subscriber database). The computer-readable signal-bearing medium for the apparatus in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a video-restricted location having at least one of a stationary and a mobile wireless communication device, the wireless communication device having a predetermined coverage area of the video-restricted location;
a mobile terminal adapted and constructed to selectively connect to the wireless communication device when the mobile terminal enters the predetermined coverage area of the video-restricted location;
the mobile terminal having a camera and a functionality that selectively disables and enables the camera; and
the wireless communication device having a functionality that causes the mobile terminal to disable the camera when the mobile terminal enters the predetermined coverage area of the video-restricted location without employing a remote administrative policy from a subscriber server.

2. The apparatus according to claim 1, wherein the wireless communication device has a base station.

3. The apparatus according to claim 1, wherein the wireless communication device has a directional antenna.

4. The apparatus according to claim 1, wherein the camera is at least one of a picture camera and a video camera.

5. The apparatus according to claim 1, wherein the wireless communication device and the mobile terminal communicate at least via a control channel, and wherein the wireless communication device effects a disabling of the camera via the control channel when the mobile terminal is detected, by the wireless communication device, within the predetermined coverage area of the video-restricted location.

6. The apparatus according to claim 1, wherein the mobile terminal has a software module that disables operation of the camera via software.

7. The apparatus according to claim 1, wherein the mobile terminal has a software module that disables operation of the camera by disconnecting the camera from a power supply in the camera.

8. The apparatus according to claim 1, wherein the mobile terminal displays a predetermined icon on a display of the mobile terminal when the camera is disabled.

9. The apparatus according to claim 1, wherein the wireless communication device automatically effects a disabling of the camera when the mobile terminal is within the predetermined coverage area of the video-restricted location.

10. The apparatus according to claim 1, wherein the wireless communication device continuously signals the mobile terminal to disable the camera when the mobile terminal is within the predetermined coverage area.

11. An apparatus, comprising:
a wireless communication device in a video-restricted location;
a mobile terminal adapted and constructed to selectively connect to the wireless communication device when the mobile terminal enters a coverage area of the wireless communication device associated with the video-restricted location;
the mobile terminal having a camera and a functionality that selectively disables and enables the camera; and
the wireless communication device having a functionality that causes the mobile terminal to disable the camera when the mobile terminal enters the coverage area of the wireless communication device associated with the video-restricted location.

12. The apparatus according to claim 11, wherein the wireless communication device is a mobile wireless communication device.

13. The apparatus according to claim 11, wherein the wireless communication device is a stationary wireless communication device.

14. The apparatus according to claim 11, wherein the camera is at least one of a picture camera and a video camera.

15. The apparatus according to claim 11, wherein the wireless communication device and the mobile terminal communicate at least via a control channel, and wherein the wireless communication device effects a disabling of the camera via the control channel when the mobile terminal is detected, by the wireless communication device, within the predetermined coverage area.

16. The apparatus according to claim 11, wherein the wireless communication device automatically effects a disabling of the camera when the mobile terminal is within the predetermined coverage area associated with the video-restricted location.

17. The apparatus according to claim 11, wherein the wireless communication device continuously signals the mobile terminal to disable the camera when the mobile terminal is within the predetermined coverage area associated with the video-restricted location.

18. A method, comprising:
  communicating with a mobile terminal configured to receive communications from a wireless communication device of a video-restricted area when the mobile terminal enters a coverage area of the video-restricted area of the wireless communication device; and
  sending an instruction to disable a camera in the mobile terminal, via the wireless communication device, when the mobile terminal is within range of the wireless communication device in the coverage area of the video-restricted location.

19. The apparatus according to claim 18, wherein the wireless communication device and the mobile terminal communicate at least via a control channel, and wherein the wireless communication device effects a disabling of the camera via the control channel when the mobile terminal is detected, by the wireless communication device, within the coverage area of the video-restricted location.

20. The apparatus according to claim 18, wherein the wireless communication device continuously signals the mobile terminal to disable the camera when the mobile terminal is within the predetermined coverage area—a coverage area of the video-restricted location.

* * * * *